United States Patent [19]

Stevens

[11] Patent Number: 5,167,853
[45] Date of Patent: Dec. 1, 1992

[54] PAINT STRIPPER AND VARNISH REMOVER COMPOSITIONS CONTAINING ORGANOCLAY RHEOLOGICAL ADDITIVES, METHODS FOR MAKING THESE COMPOSITIONS AND METHODS FOR REMOVING PAINT AND OTHER POLYMERIC COATINGS FROM FLEXIBLE AND INFLEXIBLE SURFACES

[75] Inventor: Edwin Stevens, West Orange, N.J.

[73] Assignee: Stevens Sciences, Corp., West Orange, N.J.

[21] Appl. No.: 816,606

[22] Filed: Dec. 31, 1991

Related U.S. Application Data

[60] Division of Ser. No. 475,364, Feb. 5, 1990, Pat. No. 5,098,591, which is a continuation-in-part of Ser. No. 375,137, Jun. 30, 1989, abandoned.

[51] Int. Cl.$^5$ .............................. C09D 9/00; C11D 7/50
[52] U.S. Cl. ................................ 252/162; 252/153; 252/170; 252/171; 252/DIG. 8; 134/38; 134/39; 134/40
[58] Field of Search .............. 252/153, 162, 170, 171, 252/DIG. 8; 134/38, 39, 40

[56] References Cited

U.S. PATENT DOCUMENTS

| | | | |
|---|---|---|---|
| 2,705,207 | 3/1955 | Stevens | 252/DIG. 8 |
| 3,915,880 | 10/1975 | Sepulveda | 252/99 |
| 3,954,648 | 5/1976 | Belcak | 252/158 |
| 4,276,186 | 6/1981 | Bakos | 252/158 |
| 4,350,605 | 9/1981 | Hughett | 252/305 |
| 4,533,487 | 8/1985 | Jones | 252/170 |
| 4,643,840 | 2/1987 | Brocklehurst | 252/160 |
| 4,780,235 | 10/1988 | Jackson | 252/170 |
| 4,812,255 | 3/1989 | Suwala | 252/142 |

OTHER PUBLICATIONS

Hawley's Condensed Dictionary, p. 425.

*Primary Examiner*—Paul Lieberman
*Assistant Examiner*—William S. Parks
*Attorney, Agent, or Firm*—Henry D. Coleman; R. Neil Sudol

[57] ABSTRACT

The present invention relates to non-toxic, non-flammable, safe compositions employing primarily biodegradable components for use in removing and stripping paint, varnishes and stains from hard and/or flexible surfaces. The compositions generally avoid the use of methylene chloride, methanol, toluol or acetone.

Paint stripper compositions of the present invention have flash points above about 120° F. and an absence of low-boiling VOC's comprising:

a. about 0% to about 60% by weight of a terpene compound containing at least 10 carbon atoms;
b. about 10% to about 69% by weight of N-methyl pyrrolidone or its equivalent; and
c. about 0% to about 20% by weight of an emulsifying surfactant.

Compositions of the present invention may further comprise one or more of the following: about 5% to about 15% by weight of a solvent extender or bulking agent, about 5% to about 60% of a high flash point, high $K_B$ (kauri-butanol) solvent selected from the group consisting of ethylene carbonate, propylene carbonate, butylene carbonate, glycols and glycol ethers, about 0% to about 45% water, from 0% to about 8% by weight of a thixotropic or thickening agent, preferably an organoclay thickening agent, for example, steralkonium hectorite, about 2% to about 20% by weight of an odor masking component, for example d'limonene and mixtures, thereof. In the organoclay containing compositions according to the present invention, about 10% to about 45%, preferably about 30 to 45% of a polar solvent, especially including water, ethanol, and mixtures of water and ethanol.

Methods of stripping coating from surfaces and methods of making these compositions are also described.

15 Claims, No Drawings

PAINT STRIPPER AND VARNISH REMOVER COMPOSITIONS CONTAINING ORGANOCLAY RHEOLOGICAL ADDITIVES, METHODS FOR MAKING THESE COMPOSITIONS AND METHODS FOR REMOVING PAINT AND OTHER POLYMERIC COATINGS FROM FLEXIBLE AND INFLEXIBLE SURFACES

This is a division of application Ser. No. 475,364, filed Feb. 5, 1990, now U.S. Pat. No. 5,098,591, which is a continuation-in-part of Ser. No. 375,137, filed on Jun. 30, 1989, now abandoned.

FIELD OF THE INVENTION

The present invention relates to non-toxic, non-flammable, safe compositions employing organoclay rheological additives and biodegradable components for use in removing and stripping paint, varnishes and stains from hard and/or flexible surfaces. In most instances, the compositions avoid the use of methylene chloride, methanol, toluol or acetone.

BACKGROUND OF THE INVENTION

With the introduction of new and more durable types of synthetic resins and polymers in protective and decorative coatings, the problem of stripping has become increasingly difficult. Prior art paint removers typically contain blends of aromatic solvents, ketones, paraffin, methanol and diluents, for example, mineral spirits in order to reduce raw material costs. Those prior art strippers made with the foregoing solvents focused industry attention on the flammable and toxic characteristics.

As an alternative, improved prior art solvents utilize chlorinated solvents as a way to extend the usefulness of paint strippers while simultaneously reducing fire hazards associated with their use. Methylene chloride (dichloromethane) has been almost universally used as the solvent of choice, although some compositions have been formulated with ethylene dichloride and trichlorethylene, among other chlorinated hydrocarbon solvents. Many of the chlorinated hydrocarbons including methylene chloride are suspected carcinogens and methylene chloride is designated a hazardous substance under the Federal Hazardous Substance Act (FHSA). In addition, methylene chloride, as a high vapor pressure chlorinated solvent, probably contributes to atmospheric ozone depletion. Methanol is a poison if ingested and the U.S. Consumer Products Safty Commission requires a warning designating it as a poison when its concentration in consumer products exceeds 4 percent by weight. Toluene contains trace quantities of benzene, a known carcinogen, and acetone with its high vapor pressure and low flash point is highly flammable in many prior art compositions.

Paint strippers which include methylene chloride can be formulated to soften, lift and blister paint films. The stripper which is applied to the substrate by brush, immersion or spray and allowed to loosen the paint or varnish has an available work life of only several minutes because of the tendency of the methylene chloride to evaporate rapidly. Because of the high vapor pressure of methylene chloride, in an effort to extend the work life of the stripper made with that solvent, paraffin is often included as an evaporation suppressant. The paraffin functions by forming a thin film at the surface of the paint remover which retards evaporation. This thin film formation and resultant evaporation suppressant activity of paraffin is produced by the evaporation and surface chilling which occur when methylene chloride or mixtures containing methylene chloride are exposed to air. However, methylene chloride strippers must be handled carefully since they are highly toxic and can cause severe skin irritation. Further, even with the incorporation of paraffin, the volatility of the methylene chloride is still very high and when methylene chloride is formulated with, for example, toluene, the resulting high levels of hydrocarbon emissions necessitate the provision of good ventilation to safely use the methylene chloride paint strippers.

A further disadvantage of paint strippers formulated with methylene chloride is that the short work life compromises the ability of the stripper to function efficiently in many applications. For example, many industrial uses of paint strippers involve stripping accumulated paint from equipment and walls. Paint strippers utilizing methylene chloride, suffer from the disadvantage that the short work life prevents the stripper from entering crevices in the accumulated paint layers thus creating the necessity, in some cases, of applying a large number of applications of stripper to remove a number of accumulated paint layers. Furthermore, the short work life of methylene chloride creates a recoating phenomenon in which stripped paint recoats the surface of one of the accumulated paint layers or the surface to be stripped as the solvent evaporates.

To remove paint on vertical surfaces, a thickener is generally added to avoid the problem of stripper flowing off the surface before it has had a chance to remove the paint layer. It is preferable to add a thickener, which in combination with the other stripper ingredients, may be easily washed off the surface after the stripping has taken place. However, if a paint stripper is too thick, it may be used on vertical surfaces, but it may not be amenable to spraying. Furthermore, the use of methylene chloride within the stripper may evaporate, thus producing a stripper which varies greatly in viscosity as a function of the evaporation time of the solvents in the stripper. Depending upon the required viscosity and the compatibility of the paint stripper ingredients with the paint stripper thickening system it may be necessary to reformulate the paint stripper with each application. Because of their high flash point, stripping compositions of the present invention may be adapted for a number of applications by simply changing the amount and type of thickener employed without modifying the other components. In preferred embodiments of the present invention, organoclay rheological additives, especially including the stearalkonium hectorites are utilized to produce paint stripper compositions exhibiting enhanced characteristics. Surprisingly, the use of organoclay rheological additives produces highly active paint stripping compositions which exhibit excellent activity even when up to about 45% by weight water is included in the formulation.

OBJECTS OF THE PRESENT INVENTION

It is an object of the present invention to provide paint stripper compositions which are safe and effective to remove paint and other polymeric coatings in protective and decorative coatings on flexible and inflexible surfaces.

It is also an object of the present invention to provide compositions which are non-flammable and effective paint strippers which do not contain petroleum based aromatic compounds.

It is an additional object of the present invention to provide stripping compositions and methods for removing conventional lacquers, varnishes, enamels, for example, drying oil type, alkyds, or drying oil-alkyd modified enamels, epoxy esters, epoxy amides, amine-catalyzed epoxies, acrylics and polyurethanes, among others.

It is a further object of the present invention to provide a method of stripping polymeric coatings using the compositions of the present invention.

It is yet another object of the present invention to provide a method of making the compositions of the present invention, especially those compositions which are thixotropic and utilize organoclay rheological additives and gel formation.

It is yet an additional object of the present invention to provide paint stripper pastes comprising organoclay thickeners in combination with other stripping components of the present invention.

It is still a further object of the present invention to provide efficient paint stripping compositions which are pleasant, non-offensive in odor and which do not emit harmful fumes.

It is yet an additional object of the present invention to provide an effective paint and varnish removing composition which is non-caustic, has a neutral pH and will not harm wood.

Still an additional object of the present invention is a stripping composition that stays wet and active longer, may cover more surface area than prior art compositions and strips through multiple layers of paint and varnish.

SUMMARY OF THE INVENTION

These and other objects of the present invention are accomplished by paint stripper compositions having high flash points, for example, above about 120° F. and an absence of low-boiling VOC's comprising:
a. about 0% to about 60% by weight of a terpene compound containing at least 10 carbon atoms;
b. about 10% to about 69% by weight of N-methyl pyrrolidone or its equivalent; and
c. about 0% to about 20% by weight of an emulsifying surfactant.

Compositions of the present invention may further comprise one or more of the following: about 5% to about 15% by weight of a solvent extender or bulking agent, about 5% to about 60% of a high flash point, high $K_B$ (kauri-butanol) solvent selected from the group consisting of ethylene carbonate, propylene carbonate, butylene carbonate, glycols and glycol ethers, about 0% to about 45% water, from 0% to about 8% by weight of a thixotropic or thickening agent, preferably an organoclay thickening agent, for example, stearalkonium hectorite, about 0.25% to about 20% by weight of an odor masking component, for example d'limonene and mixtures, thereof. In the organoclay containing compositions according to the present invention, about 10% to about 45%, preferably about 30 to 45% of a polar solvent, especially including water, ethanol and mixtures of water and ethanol is included in combination with the organoclay rheological additive. Depending upon the desired pH of the compositions, a base or acid may additionally be added to adjust the pH of the compositions of the present invention. In addition, for certain industrial applications it has surprisingly been found that the use of certain halogenated hydrocarbons containing both chlorine and fluorine in an amount ranging from about 2% up to about 40% results in compositions exhibiting especially advantageous stripping efficiencies.

The paint stripper compositions of the present invention are safe, effective and can be used in a wide variety of applications. Environmentally safe, biodegradable compositions of the present invention solve many of the problems associated with the use of low-boiling chlorinated hydrocarbons in prior art paint strippers, including the health hazards and environmental problems associated with the use of those stippers. The compositions of the present invention have a high flash point, preferably above about 93° C. (200° F.), are generally biodegradable and can be formulated to be highly active in the pH range of about 6.0 to about 8.0, a particularly useful advantage over prior art compositions. In addition, certain embodiments of the present invention provide the advantage that they can be used to treat a coated surface and then removed by simply washing the treated surface with water.

In one particularly preferred aspect of the present invention, stripper compositions of the present invention are adsorbed onto paper or fabric sheets and used to strip paint and other coatings from a surface. Sheets to which are adsorbed the compositions of the present invention are very easy to handle and provide simple and efficient means to remove paint from large surface areas, for example walls, doors and panels.

In another preferred embodiment of the present invention, the thixotropic agent is an organoclay rheological additive and the compositions are used as pastes. In these compositions the amount of polar solvent that can be employed without impacting the activity of the paint stripper composition may be as high as about 45% by weight. In general, water is used as the polar solvent, but preferred compositions include mixtures of ethanol and water. In addition, other polar solvents, for example, isopropanol, methanol, acetone and methylethyl ketone alone or in combination may also be used, but these are less preferred than is a mixture of ethanol and water.

The compositions of the present invention can be used to strip or remove conventional lacquers, varnishes, enamels, epoxy esters, epoxy amides and acrylics, among other polymeric coatings. The time required to strip paint finishes completely is competitive with that of conventional strippers containing chlorinated solvents, and ranges from about 5 minutes to about 80 minutes, with a preferred range of about 10 to about 35 minutes. In the case of organoclay containing paste compositions, the time required to strip paint may be as short as 5 to 10 minutes. Certain embodiments of the present invention may be used to strip multiple layers of coatings off of surfaces by exposing the surface to the paste compositions of the present invention for periods ranging from 15 minutes to more than 24 hours, sometimes even several days.

In removing coatings from surfaces, the compositions of the present invention produce a wrinkling or blistering of the polymer coating. While not to be limited by way of theory, this fundamental blistering is believed to be produced by swollen gel. When normally insoluble high polymers are placed in contact with an active solvent, the polymer absorbs the solvent and expands until an equilibrium condition occurs. In order to accommodate the increased volume and still remain within the original surface perimeter, the polymer tends to fold or wrinkle so as to relieve internal stresses. The solvent mixtures solvate the active groups of the polymer, and in so doing, reduce solid to solid adhesion. The forces which build up in the polymer generally, as a result of a combination of swelling and weakened adhesion, are sufficiently high to tear the film loose from the surface. Wrinkle formation occurs because solvent penetration into the polymer and deterioration of the polymer cohesive bonds proceed at approximately the same speed. There is rapid parting of the film from the substrate and almost as rapid rupturing of the film itself.

In the case of organoclay containing compositions, it is believed that enhanced activity associated with these compositions may be the result of water and other polar solvents in association with the organoclay rheological additives producing a solvent effect in which the terpenoids, N-Methylpyrrolidone or its equivalents and the other active components in the compositions exhibit enhanced interaction with the polymeric coating to be stripped.

In the method aspects of the present invention, compositions of the present invention are used to strip and/or remove polymeric coatings on a number of surfaces. In a particularly preferred method of using the compositions of the present invention, stripping composition preferably adsorbed to fabric or paper is placed in contact with a coated surface and after a period of time sufficient to soften and/or blister the underlying coating, the paper is removed along with the softened coating in one easy step.

Depending upon the formulation of the composition to be used, further method aspects of the present invention include making the compositions of the present invention using a stepwise procedure in which thixotropic agents are mixed separately from the active ingredients. Certain thixotropic compositions, for example methylcellulose, such as Methocel 311, available from Dow Chemical Corp. Midland, Mich., hydroxypropyl cellulose, Klucell TM, available from Hercules, Inc., Wilmington, Del., ethyl cellulose, such as Bermocol PR TM, available from Seaboard Sales, New Jersey) and organoclays such as stearalkonium hectorites modified with quaternary compounds (high medium and low polar), such as Bentone 27, as well as other Bentones including Bentone EW TM and Bentone LT TM, products of NL Industries, New Jersey, USA are included in amounts ranging from 0% to about 8%, preferably about 0.02% to about 5%, and most preferably about 1 to about 3% of thixotropic agent. Gel formation which occurs separate from the other active agents in the compositions of the present invention produces a composition exhibiting acceptable thixotropy for stripping or removing polymeric coatings on vertical surfaces and enhanced stripping activity. In addition, this method aspect of the present invention results in a composition that is much easier to make than compositions in which gel formation occurs in the presence of the active ingredients and the quality control of which can be easily monitored.

DETAILED DESCRIPTION OF THE INVENTION

The compositions of the present invention comprise from about 0% to about 60% by weight of a terpene compound. As used herein, the term terpene refers to a class of acyclic and cyclic unsaturated compounds derived from natural essential oils and resins having at least 10 carbon atoms. Terpenes that find use in the present invention include alcohols and aldehydes as well as unsaturated hydrocarbons. Any number of terpene compounds, including combinations of these terpenes may be used in the present invention as the base or primary solvent as polymer absorbents. Preferred terpene compounds are those compounds which have a $K_B$ value of at least about 108 (the same value as toluol, an aromatic hydrocarbon which is the solvent of choice in many prior art strippers) and a flash point above about 120° F.

In the case of organoclay containing compositions which generally include about 10% to about 45%, preferably 30% to about 45% of a polar solvent including water, the amount of terpene included generally comprises about 0% to about 50% by weight of the composition.

$K_B$ is a measure of the solvency of a hydrocarbon. In general, the higher the $K_B$ value, the greater the general solvent power of the hydrocarbon under test conditions described by ASTM D1133. To determine $K_B$ value, a hydrocarbon sample is added to a standard solution of kauri gum in butyl alcohol until sufficient kauri gum precipitates to blur vision of 10 point type viewed through the flask. When used in varnish, lacquer and enamel formulations, a hydrocarbon diluent with a high $K_B$ value dissolves relatively large quantities of solids.

The preferred terpene compounds for use in the present invention are represented by unsaturated hydrocarbons, alcohols and aldehydes having at least 10 carbon atoms and include 3,7-dimethyloctanol, alpha-pinene, beta-pinene, delta-3-carene, citronellal, citronellol, hydroxycitronellal, d-limonene, linalool, gamma-terpinene, tetrahydrolinalool and terpineol, among others, with cyclic terpenes being preferred. Especially preferred terpenes for use in compositions of the present invention include dipentene, because of its high $K_B$ value.

Compositions of the present invention comprise about 0% to about 60% by weight of a terpene compound. Preferred compositions of the present invention may comprise between about 15% to about 50% by weight of a terpene compound, and most preferably, comprise between about 15% to about 30% by weight of a terpene compound. Organoclay containing compositions according to the present invention generally comprise about 0% to about 50% by weight of a terpene, preferably about 10% to about 25% by weight terpenes and most preferably about 15% by weight terpenes. The terpene compounds of the present invention are used in the above-defined weight ranges because these weight ranges are effective to cause polymer expansion which facilitates paint stripping.

In certain embodiments where the preferred terpene, dipentene is used, a malodor associated with thiols sometimes occurs. In such cases, a natural odor masker, for example, d'limonene, among other odor masking agents, may be added in an amount ranging from about 0.25% to about 20% to make the compositions more pleasant in odor.

Compositions of the present invention also comprise between about 10% to about 69% by weight of N-methylpyrrolidone or its equivalent. N-methylpyrrolidone is a highly polar, water-miscible solvent which is also miscible with almost all conventional organic solvents. It is also soluble in a wide range of polymers used in the coatings industry. It serves to dissociate chemical groupings in the coatings which are not dissociated by the primary terpene solvent. Compositions containing as little as 10% by weight N-methylpyrrolidone are useful, but are slower in stripping efficiency than compositions containing higher weight percentages of N-methylpyrrolidone. Other solvents similar to N-methylpyrrolidone in solubility and solvent power may be used in the present invention, and may include structural analogues of N-methylpyrrolidone, for example N-ethylpyrrolidone and N-propylpyrrolidone, among other solvents. Of course, it will be recognized by those of ordinary skill in the art that a number of variations may be made to the structure of N-methylpyrrolidone without significantly affecting the physicochemical properties of the underlying stripping composition. Where required, one of ordinary skill in the art will know to vary the amounts and types of the other components within the stripping composition to produce an efficient paint stripping composition.

In organoclay containing compositions according to the present invention, the amount of N-Methylpyrrolidone may comprise as much as about 69% by weight, but preferably comprises about 20% to about 40% by weight and most preferably about 25 to about 30% by weight.

The present invention utilizes pyrrolidone compounds such as N-Methylpyrrolidone and similar compounds having a lactam moiety, but clearly N-methylpyrrolidone is preferred. As described hereinabove, the nitrogen of the pyrrolidone ring may be unsubstituted or substituted with alkyl groups. However, as the number of carbon atoms within the pyrrolidone compound increases beyond 3 (propyl), the water-miscibility decreases, thus affecting the ability of stripping compositions to accommodate water for microgel formation or for removal of the stripping composition from surfaces. In addition, such substitution may affect the solvent power of the pyrrolidone compound used, thus necessitating adjustments in the other components of the stripping composition. In addition to nitrogen substitution, the carbon atoms of the pyrrolidone ring may also be substituted, but such compositions for use in the present invention are less preferred than N-Methylpyrrolidone because of the cost of such compositions and the reduced polarity that often results from such substitution. For example, N,5-dimethyl 2-pyrrolidone, 2pyrrolidone, 3,3-dimethyl 2-pyrrolidone may be used in the present invention, but are less preferred than is N-Methylpyrrolidone.

The 2-keto group of N-methylpyrrolidone is not a requirement for the pyrrolidone compound of the present invention and certain pyrrolidine analogs, for example, N,2-dimethylpyrrolidine, 2,4-dimethylpyrrolidine, 2,5-dimethylpyrrolidine and N-methylpyrrolidine, among others may also be used in the present invention. Pyrrolidone and pyrrolidine compounds which may be used in the present invention may be less polar than N-Methylpyrrolidone thus necessitating adjustment to the amount and type of surfactant and/or terpene compound used.

The terpenes and N-methylpyrrolidone are miscible, and N-methylpyrrolidone itself is miscible in water. However, the terpenes and water are not miscible. Therefore, in order to provide compositions which have sufficient quantities of terpene compounds to solubilize and expand coating polymers yet accommodate minor amounts of water for microgel formation and greater amounts of water for ease of removal, one or more emulsifying surfactants are included in compositions of the present invention in an amount equal to about 0% to about 20% by weight and preferably about 2% to about 15% by weight of the paint stripping compositions of the present invention. In the organoclay containing compositions according to the present invention, when they are included, emulsifying surfactants generally comprise about 1% to about 10% by weight, preferably about 2% to about 7% by weight and most preferably about 3% to about 5% by weight.

Numerous surfactants capable of emulsifying the terpenes and other components of the present invention may be employed, including but not limited to linear or branched chain alcoholic ethoxylates and ethoxysulfates, alcohol ethoxylates, polysorbate esters, ethoxylated alkylphenols, for example, polyethoxynonylphenols, phenoxypolyalkoxyalcohols, for example, nonylphenoxypoly(ethyleneoxy)ethanol and nonylphenoxypolyethoxyethanol, alkyl and alkyl ether sulfates and sulfonates, for example, dodecylbenzenesulfonic acid, alkyl and dialkyl succinate compounds, phosphate esters, for example phosphate esters of long-chain alcohol ethoxylates and combinations of these surfactants. Particularly preferred surfactants for use in compositions of the present invention include the phosphate ester surfactants, for example PD-600 TM, an alkaline stable mixture of mono and di-substituted phosphate esters of decylalcoholethoxylate, available from Chemax, Inc. (Greenville, S.C.) and the Tryfac TM phosphate esters, a series of phosphate ester surfactants as the free acids or various salts, available from Emery Chemicals, Mauldin, S.C. Other preferred surfactants include polyoxyethylenenonylphenol (NP-6 TM and NP-9 TM, available from Chemax, Inc., Greenville, S.C.) as well as the nonionic alkylphenoxypolyoxyethylene alcohols, the Makon TM series, available from Stepan Company, Northfield, Ill. Alkylamine dodecylbenzenesulfonate, Ninate 411 TM, available from Stepan Company, the linear alkylbenzene sulfonic acid surfactant Bio-soft s-100 TM, available from Stepan, sodium 1-octane sulfonate, Bio-terge pas-8s TM, available from Stepan and Neodol 1-5 TM, a nonionic surfactant having an average of 5.0 ethylene oxide units per molecule of alcohol, available from Chemax, Inc., are also useful in the present invention. A preferred surfactant for use in paint strippers having an alkaline or basic pH includes CSX-727, an alkaline stable surfactant also available from Chemax, Inc. These preferred surfactants may be used alone or in combination to enhance the activity of the terpinoid and N-methylpyrrolidone mixture and to produce paint strippers having excellent paint stripping activity.

The pH of the paint stripper compositions of the present invention may vary from highly acidic to highly alkaline within the range of about 2.0 to greater than 11.0. Preferred compositions generally have a neutral pH. Paint strippers of the present invention which are to be used as industrial or military paint strippers may be very alkaline, i.e., have a pH above about 10.0, because enhanced paint stripping activity has been exhibited by paint strippers having a pH above about 10.0. However, a number of preferred embodiments of the paint stripper of the present invention have a pH within the range of about 5.5 to about 8.0 and preferably within the range of about 6.0 to about 8.0. It is a particularly surprising result that paint stripper compositions of the present invention show substantial paint stripping activity in the industrial setting within a neutral pH range of about 6.0 to about 7.0. Thus, although an acidic or basic accelerator may be added to compositions of the present invention to increase stripping efficiency and shorten stripping time, such an acidic or basic accelerator is not necessary. In compositions to be used in the home by the consuming public, it is preferred to exclude an acidic or basic accelerator which generally reduces the safety of the compositions. In the preferred organoclay containing compositions, enhanced paint stripping activity is associated with a neutral pH, i.e., about 6.5 to about 7.5. This is a surprising result that such enhanced activity may be obtained without very high or very low pH conditions.

Although anionic, nonionic and cationic surfactants may be employed in certain embodiments of the present invention, it is preferable to employ nonionic surfactants. It may be preferable in certain embodiments of the present invention to include a mixture of surfactants to enhance the solubility of certain active components in oil or water. A surfactant mixture may serve to promote the stripping of the polymeric coating by the active components and enhance the removal of the stripper and stripped coating by a washing step.

Compositions of the present invention may also include a solvent extender in an amount equal to about 5 to about 15 percent by weight of the compositions. The solvent extenders in the present invention function primarily as bulking agents, but they may also function to enhance certain solubility characteristics of the compositions. In addition, the solvent extenders used in the present invention may be useful in certain embodiments for forming gel from thixotropic agents used in the present invention. Typical solvent extenders for use in the present invention include small chain alcohols, for example, ethanol and isopropanol, among others.

Organoclay containing compositions according to the present invention generally contain a polar solvent in an amount ranging from about 10% to about 45% by weight and preferably about 30% to about 45% by weight. Although higher weight percentages of polar solvent may be used, they are generally less preferred. A polar solvent for purposes of the present invention includes those solvents and mixtures of solvents which, in combination with sufficient amounts of organoclays such as the stearalkonium hectorites, for example, the Bentones TM, produce a thixotropic gel after mixing under shearing force. Exemplary polar solvents for use in the present invention include water, ethanol, isopropanol, methanol, acetone and methylethyl ketone, among others, including mixtures of these solvents. Water, ethanol and mixtures of water and ethanol are clearly preferred.

Paint stripper compositions of the present invention may also include about 5% to about 60%, preferably about 20% to about 40% of a high flash point, high $K_B$ (kauri-butanol) solvent selected from the group consisting of polycarbonates, including ethylene carbonate, propylene carbonate and butylene carbonate, and glycols and glycol ethers. This high flash point, high $K_B$ solvent is added to increase the flash point of compositions as well as maintain the ability of the compositions to blister and remove polymeric coatings from surfaces. The paint stripping compositions of the present invention have a flash point of at least about 150° F., preferably at least about 175° F. and most preferably at least about 200° F., flash points which are obtainable, at least in part by virtue of the amount of high flash point solvent added to the compositions. Preferred high flash point solvents for use in the present invention have a flash point of at least about 80° C. and a $K_B$ of at least about 300. In the organoclay compositions according to the present invention, the high $K_B$ solvent preferably comprises about 5% to about 40% by weight of the compositions.

Glycols useful in embodiments of the present invention include ethylene glycol, propylene glycol and butylene glycol, among others. Glycol ethers may be selected from among a number of agents including ethyleneglycolmonomethylether, diethyleneglycolmonomethylether, tri-ethyleneglycolmonomethylether, ethyleneglycolmonoethylether, di-ethyleneglycolmonoethylether, triethyleneglycolmonoethylether, ethyleneglycolmonopropylether, di-ethyleneglycolmonopropylether, ethyleneglycolmonobutylether, diethyleneglycolmonobuylthylether, triethyleneglycolmonobutylether, ethyleneglycolmonohexylether, diethyleneglycolmonohexylether, ethoxypropyleneglycolmonobutylether, propyleneglycolmonomethylether, dipropyleneglycolmonomethylether, tripropyleneglycolmonomethylether, propyleneglycolmonopropylether, di-propyleneglycolmonopropylether, propyleneglycolmono-t-butylether, propyleneglycolmonobutylether and dipropyleneglycolmonobutylether, among others. Preferably, propylene carbonate is used in compositions of the present invention because of its favorable flash point and $K_B$ value as well as its general safety and lack of toxicity.

Another component which may be added to the compositions of the present invention includes water in an amount equal to about 0% to about 45%. Preferably water comprises about 0.5% to about 20% by weight of the composition in those embodiments which do not contain organoclay rheological additives. In those compositions containing the organoclay rheological additives, for example, the stearalkonium hectorites such as the Bentones TM, the amount of polar solvent including water comprises about 10% to about 45%, preferably about 30% to about 45% by weight of the compositions.

Water is added in certain embodiments of the present invention to provide solubility characterisitics so that the stripping compositions, after they have blistered the paint or varnish coating a surface to be stripped, may be washed off from the surface with a stream of water. In addition, in certain embodiments containing a thixotropic agent such as the celluloses, water is added to aid the formation of gel. Of course, as the percent by weight of water changes, the other components of the compositions and in particular, the terpene and terpene emulsifying surfactant components may have to be adjusted to accommodate the additional water.

Compositions of the present invention may also include a thixotropic agent to increase viscosity so that compositions of the present invention may be applied to vertical surfaces without running off. Compositions of the present invention may comprise between 0% and about 8% of a thixotropic agent, preferably about 0.02% to about 5% and most preferably, about 1% to about 3% by weight of a thixotropic agent. Certain thixotropic compositions, for example methylcellulose, such as Methocel 311 TM, available from Dow Chemical Corp., Midland, Mich., hydroxypropyl cellulose, Klucell TM, available from Hercules, Inc., Wilmington, Del., ethyl cellulose ethers, such as Bermocol PR TM, available from Seaboard Sales, New Jersey) and organoclays modified with quaternary compounds (high, medium and low polar), such as the stearalkonium hectorites, for example, Bentone 27, Bentone EW TM and Bentone LT ™, products of NL Industries, New Jersey, USA are preferred, with the Bentones ™, especially Bentone EW ™ being particularly preferred.

The organoclay additives are preferably utilized as thixotropic agents in the varnishes and paint remover compositions of the present invention. The organoclays which can be utilized in the present invention generally depend on wetting, shear and polar activation for rheological development. One class of the organoclays, the high performance hydrophilic organoclays, including Bentone EW ™ and Bentone LT ™, depend only upon shear, hydration and wetting for activity. These hydrophilic organoclays offer the formulator opportunities to incorporate large quantities of water, i.e., up to 45% by weight in paint remover compositions thereby reducing cost and eliminating hazards associated with flammable compositions without reducing the efficacy of the compositions.

Compositions of the present invention include a thixotropic agent to increase the viscosity of the compositions to a level which will result in a paint stripper which will remain on vertical surfaces for a period of time at least long enough to blister the polymeric coating on such surface and exhibit efficient stripping efficiency. Preferred thixotropic agents include ethyl cellulose and Bentone EW ™, among other agents, which produce a gel when mixed into the paint stripping compositions of the present invention.

Gel formation may be produced by any method including simply mixing the thixotropic agent into the composition at any time. However, it is advantageous to form a gel separately from the active components for ease of formulation. Gel formation which occurs separately from the other active agents in the compositions of the present invention produces a composition exhibiting acceptable thixotropy for stripping or removing polymeric coatings on vertical surfaces and enhanced stripping activity. In addition, this method of the present invention comprising forming gel separately from the active agents (in the presence of water and/or a bulking agent such as ethanol) and then adding the microgel mixture to the separately mixed active component results in a composition that is much easier to make and the quality control of which can be easily monitored. The texture of these compositions made by this method is often superior as well.

In certain embodiments of the present invention, especially those compositions which may be used to remove especially difficult polymers, for example in many military and industrial applications, compositions of the present invention, may additionally comprise between 0% and 40% by weight of a chlorinated, fluorinated hydrocarbon (chlorofluorocarbons, CFCs or HCFCs) having a boiling point of at least about 45° C. The weight percent of CFCs used in compositions of this aspect of the present invention ranges between 0% and 40%, preferably about 1% to about 25% and most preferably about 2% to about 18% by weight of the paint stripping compositions. The CFCs are added to compositions of the present invention to provide an additional component to blister the polymeric coatings on surfaces. Paint stripping compositions of the present invention which include CFCs generally exhibit greater stripping efficiencies than those which do not. Surprisingly, certain organoclay compositions according to the present invention which do not include CFCs (HCFCs) are active against especially difficult coatings including cured coatings on military hardware.

A number of CFCs may be used in the present invention, but preferred CFCs have a boiling point that exceeds at least about 45° C. Although lower boiling point CFCs may be used, they are difficult to work with because of their tendency to volatilize rapidly. CFCs used in the present invention are nonflammable and do not flash and are advantageously included in certain compositions of the present invention to modify the stripping efficiency as well as increase the flash point of the composition. Preferred CFCs include those in which the number of fluorine atoms is the same or greater than the number of chlorine atoms and the number of carbon atoms ranges from 2 to 4. Exemplary CFCs include $CCl_2F_2$ (CFC 113 ™, available from DuPont, Wilmington Del.), $CHCl_2CF_3$ (CFC 123 ™, also available from DuPont), $CHClF_2CH_2Cl$ (1,2-dichloro-1,1-difluoroethane), $CHClFCH_2Cl$ (1,2-dichloro-1-fluoroethane), $CCl_2FCCl_2F$ (1,1,2,2-tetrachloro-1,2-difluoroethane), $CHClFCHCl_2$ (1,2,2-trichloro-1-fluoro-ethane), $FCl_2CCCl_3$ (fluoropentachloroethane), $F(CH_2)_3Cl$ (1-chloro-3-fluoropropane), $CH_2ClCF_2CH_3$ (1-chloro-2,2-difluoropropane), $CH_2ClCClFCH_3$ (1,2-dichloro-2-fluoropropane), $CF_2ClCClFCClF_2$ (1,2,3-trichloro-1,1,2,3,3-pentafluoropropane), $CF_2ClCCl_2CF_2Cl$ (1,2,2,3-tetrachloro-1,1,3,3-tetrafluoropropane) and $Cl(CH_2)_4F$ (1-chloro-4-fluoro-butane), among others. Most preferably, HCFC 123 ™ is used in certain embodiments of the present invention in amounts ranging from about 2% to about 40%, preferably about 2% to about 25% and most preferably about 2% to about 18% by weight of the compositions.

The compositions of the present invention are generally applied to the surface to be stripped in the usual manner, i.e., the compositions are first applied by brush, spatula or other applicator and then are applied to the surface to be stripped. Alternatively, the compositions may be sprayed onto a surface in a continuous flow method which recirculates the composition. Generally, the compositions are in contact with the surface for a period of time sufficient to produce a blistering of the polymeric coating, after which time, the blistered coating is removed by contacting the coating with an abrasive pad. Alternatively, the coating is removed by simply lifting the blistered coating off of the surface or by spraying the blistered coating with water. Certain embodiments of the present invention, including the impregnated fabric and the organoclay containing compositions may be applied to a coated surface for periods exceeding 24 hours.

In a particularly preferred embodiment of the present invention, the stripping compositions of the present invention are adsorbed onto a fabric piece comprising cloth or paper and applied to a surface to be stripped. Generally, a non-woven, highly absorbent fabric, without chemical binders is used. Although any fabric or paper which absorbs the compositions of the present invention and is stable to the compositions of the present invention may be used in this aspect of the present invention, preferred fabrics include a thermally bonded composite blend of cellulose and propylene (cellulose/propylene), typically a 50-50 percent by weight blend of each component. Additionally, different fabrics based upon polyester, rayon/polyester blends and woodpulp/polyester blends (the Sontara ™ fabrics from DuPont), among others may be used efficiently. The fabric may range in thickness and abrasive quality, but typically, preferred fabrics range in thickness from about 0.28 mm up to 1.02 mm.

Generally, cloth having a basis weight of approximately 2 ounces/yard is satisfactory for use in the present invention, but the basis weight may vary without impacting the stripping efficiency of the compositions of the present invention. Fabric to which compositions of the present invention are adsorbed are generally packaged in a barrier bag to prevent the transmission of vapor. Generally, the barrier bag is made of aluminum foil or other material which will not transmit vapor from the paint stripping compositions of the present invention.

The procedure for making the fabric applicator of the present invention is quite simple. In general, fabric is cut or slit to the appropriate size depending upon application, folded and inserted into the barrier bag which is sealed on three of four sides. Thereafter, a metered volume of stripper composition is injected into the open end of the barrier bag which is then immediately sealed. After the injection of paint stripper and during storage, the paint stripper composition impregnates the fabric applicator.

The fabric applicator is designed to blister and remove coatings from surfaces. It is especially useful when applied to vertical surfaces because it adheres when applied. The fabric applicator and paint stripper composition is designed so that there is sufficient tension between the applicator and the applied surface to retain it on the surface of the wall. By design, the applicator continuously applies composition to the surface to be stripped until the paint has lifted. A particularly advantageous feature of this aspect of the present invention is the fact that paint stripper composition will not evaporate from the applied surface because the fabric significantly reduces evaporation. Thus, the fabric embodiment of the present invention may be used on particularly difficult coatings and on multiple layers where the contact time between the paint stripper and the coated surface needs to be longer than in less rigorous applications.

To use the fabric aspect of the present invention, the fabric applicator to which stripper composition is adsorbed is placed on a coated surface. The applicator remains in contact with the coated surface for a period sufficient to blister the underlying coating. Such period may be 24 hours or longer for particularly difficult coatings. Once the coating blisters, the applicator is simply peeled off, usually with the underlying coating fixed to the applicator. Often there is no need to scrape or abrade the coating.

The following characerics are identifiable in compositions of the present invention:

(1) Increased stripping efficiency, i.e., reduced stripping time, and increased penetration through multiple layers comparable to commercially available methylene chloride strippers.

(2) Raised flash point of the formulations to provide a stripper which will not evaporate within a stripping period.

(3) Minimized objectionable odors.

(4) Neutral pH for widest possible range of utilization and safety.

(5) Highest possible TLV (threshold limit value) and exposure, lowest toxicity, and maximum environmental acceptability.

(6) A water soluble stripper composition which can be used in industrial settings where removal is performed by spraying a stripped surface with water.

(7) Impregnate absorbent material for application of impregnated sheets to vertical surfaces to be stripped.

(8) Fabric applicator utilizes absorbent materials with properties of low density, high absorbancy and durability, without binders, and non-effected by ingredants of composition.

(9) Organoclay containing compositions containing high concentrations of water exhibiting enhanced stripping activity.

The following examples are provided to illustrate the present invention and should not be misunderstood to limit the scope of the present invention in any way.

EXAMPLES

General Procedure for Formulating Examples 1–22

Each component of the paint stripping composition of the present invention is weighed out. Generally, the terpene and N-methylpyrrolidone or its equivalent are first blended. A high flash point, high $K_B$ solvent may then be added to the above mixture. The surfactant system is first mixed (surfactant and water) and then added to water and mixed. The water/surfactant mixture is then added to the terpene and N-methylepyrrolidone. In cases where a thixotropic agent was added, thixotropic agent was added to water and a bulking agent which are blended together using an air-driven agitator until homogeneous. The mixture containing thixotropic agent is then added to the terpene/N-methylpyrrolidone/surfacant mixture of components. This mixture is then agitated until the composition is homogeneous.

In the case of organoclay rheological additives, the clay is first mixed with the polar solvent, generally a mixture of ethanol and water to produce phase A. Phase B, which contains the other ingredients, is prepared separately. The ingredients comprising phase B may be added in any order. After mixing, phase B is added to phase A and subjected to vigorous mixing under shearing force to produce a uniform gel-like or paste-like product. The composition is then tested for stripping activity.

General Testing Procedures

Standardized test panels coated with the substrate to be stripped are prepared. Enamels, alkyds, epoxies, latex, acrylics and conventional lacquers were tested. Testing was performed on metal plates with three coats of paint, each coat of different color so as to permit observation and time measurement of coating penetration. In the case of organoclay containing compositions, the testing was performed on a number of metal plates as described above, wood panels, boards and sections of doors. Stripping efficiency is defined as the ratio of the time required to observe blistering divided by 20 (minutes).

The testing of strippers occurred in three steps. In the first step, utilizing standard test plates, a droplet approximately ½ inch in diameter of a stripping composition is placed onto the test plate, and the time until the coating blisters is then measured. Compositions which showed a stripping time of less than 40 minutes are then tested in a second test. In the second test, the coating composition is then applied onto a substrate by brushing and the time to blister is measured. In a third test, candidate compositions are tested for stripping efficiency, odor, ease of use and product satisfaction. In this third test, two methods of stripper application have been utilized. The first method is continuous flow, where the composition is applied to the substrate by pumping (air pressure) and recirculation of the solution while an abrasive pad is used to remove the coating. This application requires a liquid solution in order to facilitate flow and pumping. In a second method of the third test, a thixotropic solution (to minimize flow and dripping when applied) is brushed onto irregular, ornate or vertical surfaces. This test is utilized to determine the efficacy of thixotropic and especially organoclay containing compositions according to the present invention. In the third test, the formulations of the present invention were compared to conventional paint strippers. The most challenging substrates were chosen to be stripped, to establish the perfomance criteria expected of competitive paint strippers.

EXAMPLE 1

Alkaline Stripper System #1

|  | |
|---|---|
| DIPENTENE | 47 |
| ISOPROPANOL | 6 |
| N-METHYLPYRROLIDONE | 33 |
| SURFACTANT SYSTEM | |
| (WITCOLATE D5-10) | 8 |
| (NP-9) | 4 |
| WATER/KOH | 2 |

Procedure: Dipentene, isopropanol and N-methylpyrrolidone were mixed separately. Surfactant system and water were first mixed separately and then added to above mixture.

Result: Useful compositions for stripping. Stripping time was about 60 minutes. Phase separations and solution stratification were evidenced.

EXAMPLE 2

Alkaline Stripper System #2

| COMPONENT | WEIGHT PERCENT |
|---|---|
| DIPENTENE | 47 |
| ISOPROPANOL | 6 |
| M'PYRROLIDONE | 33 |
| SURFACTANT SYSTEM | |
| (WITCOLATE D5-10) | 8 |
| NP-6 [polyoxyethylene (6) nonyl phenol] | 4 |
| WATER/KOH | 2 |

Procedure: Same as example 1.

Results: pH in the alkaline range. Stripping time was about 60 minutes. Useful stripper composition which evidenced phase-separation upon standing. Must be vigorously mixed before use.

EXAMPLE 3

Alkaline Stripper System #3

| COMPONENT | WEIGHT PERCENT |
|---|---|
| DIPENTENE | 47 |
| ISOPROPANOL | 6 |
| N-METHYLPYRROLIDONE | 33 |
| SURFACTANT SYSTEM: | 12 |
| CSX-727/KOH (75% solution) | |
| KASIL | |

| COMPONENT | WEIGHT PERCENT |
|---|---|
| WATER | 2 |

Procedure: Same as examples 1 and 2.

Results: pH alkaline. Composition effective, but turbid. Stripping time was about 60 minutes. All components could not be completely solubilized.

EXAMPLE 4

Alkaline Stripper System #4

| COMPONENT | WEIGHT PERCENT |
|---|---|
| DIPENTENE | 47 |
| ISOPROPANOL | 6 |
| N-METHYLPYRROLIDONE | 33 |
| SURFACTANT SYSTEM: | 12 |
| CSX-727/KOH (50%) | |
| KASIL #1 | |
| WATER | 2 |

Procedure: General method, as per examples 1-3

Results: Same as example 3- produced a useful but turbid suspension. Not all components solubilized.

EXAMPLE 5

Alkaline Stripper System #5

| COMPONENT | WEIGHT PERCENT |
|---|---|
| KOH SOLUTION (75%) | 33 |
| KABIL #1 | 32 |
| CSX 727 | 5 |
| METHYL PYRROLIDONE | 10 |
| FURFURYL ALCOHOL | 20 |

Procedure: Same as general method. KOH solution, CSX 727 and Kabil #1 mixed separately until completely homogeneous.

Results: pH is alkaline. Stripping efficiency marginal (50 min. to soften — no lifting evident).

EXAMPLE 6

Alkaline Stripper System # 6

| COMPONENT | WEIGHT PERCENT |
|---|---|
| KOH SOLUTION (75%) | 20 |
| KASIL #1 | 32 |
| CSX 727 | 5 |
| DIPENTENE | 13 |
| N-METHYL PYRROLIDONE | 10 |
| FURFURYL ALCOHOL | 20 |

Procedure: General method, same as example 5.

Results: pH is alkaline, somewhat malodorous. Marginal stripping efficiency evidenced. Results similar to example 5. Malodor associated with dipentene at high pH. Alkaline based strippers (Examples 1-6) showed utility, but compositions needed to be buffered to produce a long shelf-life product.

EXAMPLE 7

Neutral pH Stripper System #1

| COMPONENT | WEIGHT PERCENT |
|---|---|
| PROPYLENE CARBONATE | 45 |

-continued

| COMPONENT | WEIGHT PERCENT |
|---|---|
| N-METHYL PYRROLIDONE | 25 |
| PD-600 (phosphate ester) | 7 |
| GLIDCOL 95 (pine oil derivative with high $K_B$) | 3 |
| DIPENTENE | 7 |
| ISOPROPANOL | 9 |
| WATER | 3 |
| METHYL CELLULOSE | 1 |

Procedure: Follows general method. About half of water is used to create surfactant/water mixture which is added to mixture of propylene carbonate, n-methylpyrrolidone, glidcol 95 and dipentene. Other half of water is used with isopropanol and methyl cellulose to produce microgel mixture which is added to mixture of other components.

Results: Compositions showed better stripping efficiency than high pH systems. Stripping efficiency slightly reduced by methyl cellulose thickener.

EXAMPLE 8

Neutral pH Stripper System #2

| COMPONENTS | WEIGHT PERCENT |
|---|---|
| PROPYLENE CARBONATE | 45 |
| N-METHYL PYRROLIDONE | 25 |
| PD-600 | 7 |
| GLIDSOL 150 (pine oil derivative with high $K_B$) | 3 |
| DIPENTENE | 7 |
| ISOPROPANOL | 9 |
| WATER | 3 |
| METHYL CELLULOSE | 1 |

Procedure: Same as Example 7.
Results: Composition showed results similar to Example 7.

EXAMPLE 9

Neutral pH Stripper System #3

| COMPONENT | WEIGHT PERCENT |
|---|---|
| PROPYLENE CARBONATE | 45 |
| n-METHYL PYRROLIDONE | 25 |
| PD-600 | 7 |
| GLIDSOL 100 (pine oil derivative with high $K_B$) | 3 |
| DIPENTENE | 7 |
| ISOPROPANOL | 9 |
| Water | 3 |
| METHYL CELLULOSE | 1 |

Procedure: Same as examles 7 and 8.
Results: Examples 7-9 utilize pine oil derivatives, which, although high in KB value, with higher flash points and less odor than dipentene tend to inhibit stripping efficiency to a certain degree compared to dipentene. Dipentene exhibits superior substrate penetration of paints and varnishes to other terpenoid solvents tested.

EXAMPLE 10

Neutral pH Stripper System #4

| COMPONENT | WEIGHT PERCENT |
|---|---|
| PHENOXY ETHANOL (DIETHYLENE GLYCOL MENOPHENYL ETHER) | 20 |
| DIPENTENE | 20 |
| D'LIMONENE | 10 |
| N-METHYL PYRROLIDONE | 15 |
| PD-600 | 8 |
| WATER | 2 |

Procedure: Same as examples 1-6 and general method.

Results: Good solvent properties- good stripping efficiency, about 30 minutes. Thoroughly miscible - no objectionable odors. Flash point slightly too low.

EXAMPLE 11

Neutral pH Stripper System # 5

| COMPONENT | WEIGHT PERCENT |
|---|---|
| PHENOXY ETHANOL (DIETHYLENE GLYCOL MONOPHENYL ETHER) | 20 |
| DIPENTENE | 20 |
| D'LIMONENE | 10 |
| N-METHYL PYRROLIDONE | 40 |
| PD-600 | 8 |
| PROPYLENE CARBONATE/ETHYLENE CARBONATE (50/50) | 25 |
| WATER | 2 |

Procedure: Same as example 10 and general method. Surfactant and water mixed separately and added to a mixture of the other components.

Results: Composition showed good stripping efficiency. But less favorable attributes of phenoxy ethanol from a safety standpoint associated with its use than for other surfacant systems. D'Limonene reduced the odor from dipentene.

EXAMPLE 12

Neutral pH Stripper System #6

| COMPONENT | WEIGHT PERCENT |
|---|---|
| PROPYLENE CARBONATE | 40 |
| N-METHYL PYRROLIDONE | 40 |
| D'LIMONENE | 5 |
| ISOPROPANOL | 5 |
| PD-600 | 8 |
| METHOCELL | 1 |
| WATER | 1 |

Procedure: Same as general method and examples 10 and 11, but methocell and water mixed separately to form microgel before adding to mixture of other components.

Results: Composition exhibited good stripping efficiency. Odor masked effectively by the d'limonene.

EXAMPLE 13

Neutral pH Stripper System #7

| COMPONENT | WEIGHT PERCENT |
|---|---|
| PROPYLENE CARBONATE | 30 |
| N-METHYL PYRROLIDONE | 30 |
| DIPENTENE | 20 |
| D'LIMONENE | 5 |
| ETHANOL | 5 |
| PD-600 | 8 |
| ETHYL CELLULOSE | 1 |
| WATER | 1 |

Procedure: Same as example 12 and general method.
Results: Good stripping efficiency. Ethyl cellulose exhibited better thixotropic characteristics than methyl cellulose.

EXAMPLE 14

Neutral pH Stripper System #8

| COMPONENT | WEIGHT PERCENT |
|---|---|
| PROPYLENE CARBONATE | 35 |
| N-METHYL PYRROLIDONE | 25 |
| DIPENTENE | 20 |
| D'LIMONENE | 5 |
| ETHANOL | 5 |
| PD-600 | 8 |
| ETHYL CELLULOSE | 1 |
| WATER | 1 |

Procedure: Same as examples 12 and 13 and the general method.
Results: Product exhibited good stripping efficiency, no odor.

EXAMPLE 15

Neutral pH Stripper System #9

| COMPONENT | WEIGHT PERCENT |
|---|---|
| PROPYLENE CARBONATE | 35 |
| N-METHYL PYRROLIDONE | 25 |
| DIPENTENE | 15 |
| D'LIMONENE | 5 |
| ETHANOL | 10 |
| PD-600 | 8 |
| ETHYL CELLULOSE | 1 |
| WATER | 1 |

Procedure: Same as examples 12, 13 and 14 and general method.
Results: Product evidenced good stripping efficiency, no odor.

EXAMPLE 16

Neutral pH Stripper System #10

| COMPONENT | WEIGHT PERCENT |
|---|---|
| PROPYLENE CARBONATE | 30 |
| N-METHYL PYRROLIDONE | 25 |
| DIPENTENE | 15 |
| D'LIMONENE | 3 |
| ETHANOL | 10 |
| PD-600 | 5 |
| ETHYL CELLULOSE | 1 |
| WATER | 1 |
| HCFC-123 | 10 |

Procedure: Same as 12, 13, 14 and 15. HCFC-123 added to propylene carbonate, N-methylpyrrolidone, dipentene, d'limonene and surfactant mixture until homogeneous. Thixotropic mixture added to above mixture until homogeneous.
Results: Excellent stripping efficiency (about 20-30 minutes). HCFC-123 provided additional stripping efficiency for composition. Odor was masked.

EXAMPLE 17

Neutral pH Stripper System #11

| COMPONENT | WEIGHT PERCENT |
|---|---|
| PROPYLENE CARBONATE | 30 |
| N-METHYL PYRROLIDONE | 25 |
| DIPENTENE | 15 |
| D'LIMONENE | 3 |
| ETHANOL | 10 |
| ETHYL CELLULOSE | 1 |
| PD-600 | 5 |
| WATER | 1 |
| HCFC 113 (FREON) | 10 |

Procedure: Same as Example 16, above.
Results: Excellent stripping efficiency on the order of about 20 to 30 minutes.

EXAMPLE 18

Low pH Stripper Composition #1

| | |
|---|---|
| DIPENTENE | 40 |
| ISOPROPANOL | 25 |
| N-METHYLPYRROLIDONE | 25 |
| DODECYLBENZENE SULFONIC ACID (LINEAR) | 8 |
| WATER | 2 |

Procedure: Same as general method and examples 1-6.
Results: pH is acidic. Stripping efficiency acceptable (about 60 minutes). Evidences that a composition having a pH below 7 may accelerate stripping action on substrates.

EXAMPLE 19

Low pH Stripper Composition #2

| | |
|---|---|
| Dipentene | 40 |
| Isopropyl alcohol | 25 |
| N-Methylpyrrolidone | 25 |
| Triethanolamine | 4 |
| Dodecylbenzene Sulfonic Acid (linear) | 4 |
| Water | 2 |

Procedure: Same as Example 18.
Results: pH is acidic. Stripping efficiency marginal and certainly less acceptable than Example 18. Little stripping action observed for limited timeframe (about 60 minutes). Produced foam when washed off sample plate. Foam was apparently produced by in situ formation of triethanolamine sulfonate.

EXAMPLE 20

Low pH Stripper Composition #3

| | |
|---|---|
| Dipentene | 30 |
| Ethanol | 15 |
| N-Methylpyrrolidone | 20 |

-continued

| | |
|---|---|
| Ethylene Carbonate/Propylene Carbonate (50/50) | 20 |
| Dodecylbenzene Sulfonic Acid (linear) | 8 |
| Water | 7 |

Procedure: For the most part is the same as Examples 18 and 19. Heated ethylene carbonate sample, added an equal weight of propylene carbonate (solubility of ethylene carbonate is greater than that of propylene carbonate). Ethylene carbonate tended to crystallize out of solution upon cooling- re-solubilized upon heating.

Results: pH is acidic. Flash point lowered by increasing water content. Composition showed stripping activity, but was difficult to work with because of tendency of ethylene carbonate to crystallize out of solution.

EXAMPLE 21

Low pH Stripper Composition #4

| COMPONENT | WEIGHT PERCENT |
|---|---|
| Dipentene | 20 |
| Ethanol | 15 |
| N-Methylpyrrolidone | 25 |
| Propylene Carbonate | 30 |
| Dodecylbenzene Sulfonic Acid (linear) | 4 |
| Triethanolamine | 4 |
| Water | 2 |

Procedure: Same as general method and Examples 18 and 19.

Results: Acidic pH. Showed marginal stripping efficiency. Propylene carbonate increased the flash point. Evidence of foam from triethanolamine sulfonate.

EXAMPLE 22

Low pH Stripper Composition #5

| Component | Weight Percent |
|---|---|
| Dipentene | 20 |
| Ethanol | 15 |
| N-Methylpyrrolidone | 25 |
| Propylene Carbonate | 30 |
| Dodecylbenzene Sulfonic Acid (linear) | 8 |
| Water | 2 |

Procedure: Same as general method and Examples 21, 18 and 19.

Results: Showed marginal stripping efficiency, perhaps slightly better than example 21, because of absence of triethanolamine sulfonate foam. Propylene carbonate increased the flash point. Removal of triethanolamine resulted in no evidence of foam from triethanolamine sulfonate.

EXAMPLE 23

Impregnated Non-Woven Paint Strip Applicator Packaged in an Aluminum Foil Barrier Bag A non-woven, highly absorbent fabric, without chemical binders, thermally bonded composite blend of cellulose and polypropylene- typically a 50-50 (percent by weight) blend is used. Cloth having a basis weight of approximately 2 (oz./yd) has proven satisfactory. Other blends free of materials incompatible with stripper composition may be used. A fabric without additives, fillers or an adhesive promotes stability and shelf life of the product.

The stripper used may be any described hereinabove, but preferred stripper compositions include those as described in Examples 16 and 17.

Barrier bag (one which will not transmit vapor made of aluminum foil), for example, aluminum foil.

Procedure: the fabric bag is slit to an appropriate size, for example 3' by 4', folded and inserted into barrier package sealed on three sides. A metered volume of stripper composition, designed to impregnate the fabric is injected into the open end of the barrier bag which is then immediately sealed.

Results: The applicator is designed to blister and remove coatings from surfaces. It is particularly useful when applied to vertical surfaces because it adheres when applied. The applicator and paint stripper composition is designed so that there is sufficient surface tension between the applicator and the applied surface to retain it and allow it to continuously apply composition, without evaporation, until paint has lifted.

EXAMPLE 24

Organoclay Composition # 1

| Component | Weight Percent | Phase |
|---|---|---|
| Bentone EW | 2.33 | A |
| $H_2O$ | 13.1 | A |
| Ethanol (95%) | 13.1 | A |
| Dipentene | 9.56 | B |
| N-methylpyrrolidone | 34.88 | B |
| Propylene Carbonate | 24.41 | B |
| PD-600 (Surfactant) | 9.56 | B |

Procedure: Phase A was made first by adding a mixture of ethanol and water to Bentone and then stirring for a period of about 10 to 15 minutes. Note that if water or ethanol is first added and mixed with the Bentone before the other solvent is added, there may be a need to mix the Bentone, $H_2O$/ethanol mixture vigorously for a much longer period of time and even then the texture may not be as favorable.

Phase B was prepared by adding each of the components in any order and then mixing for a period of about 15 minutes in a single spindle mixer at about 800 RPM. Phase B was then added to phase A under shearing force in a single spindle mixer (about 800 to above 1,000 RPM) for 30 minutes or until homogeneous. Results: Consistency of the product was similar to petroleum jelly. Stripping efficiency was acceptable (Latex coating removed in about 15 minutes).

EXAMPLE 25

Organoclay Composition # 2

| Component | Weight Percent | Phase |
|---|---|---|
| Bentone EW | 3.39 | A |
| $H_2O$ | 25.42 | A |
| Ethanol (95%) | 8.48 | A |
| N-methylpyrrolidone | 33.89 | B |
| Propylene Carbonate | 23.73 | B |
| PD-600 (Surfactant) | 5.09 | B |

Procedure: Phase A was made first by adding a mixture of ethanol and water to Bentone and then stirring for a period of about 10 to 15 minutes.

Phase B was prepared by adding each of the components in any order and then mixing for a period of about 15 minutes in a single spindle mixer at about 800 RPM.

Phase B was then added to phase A under shearing force (about 800 to above 1,000 RPM) for 30 minutes or until homogeneous.

Results: Consistency of the product was similar to petroleum jelly. Stripping efficiency was acceptable.

EXAMPLE 26

Organoclay Composition # 3

| Component | Weight Percent | Phase |
|---|---|---|
| Bentone EW | 7.69 | A |
| H₂O | 9.62 | A |
| Ethanol (95%) | 14.42 | A |
| N-methylpyrrolidone | 38.46 | B |
| Propylene Carbonate | 26.92 | B |
| PD-600 (Surfactant) | 2.89 | B |

Procedure: Phase A was made first by adding a mixture of ethanol and water to Bentone and then stirring for a period of about 10 to 15 minutes.

Phase B was prepared by adding each of the components in any order and then mixing for a period of about 15 minutes in a single spindle mixer at about 800 RPM. Phase B was then added to phase A under shearing force (about 800 to above 1,000 RPM) for 30 minutes or until homogeneous.

Results: Consistency of the product was considerably thicker than Examples 23 and 24 and similar to paste. Stripping efficiency was acceptable.

EXAMPLE 27

Organoclay Composition # 4

| Component | Weight Percent | Phase |
|---|---|---|
| Bentone EW | 2.92 | A |
| H₂O | 11.70 | A |
| Ethanol (95%) | 11.70 | A |
| Dipentene | 11.70 | B |
| N-methylpyrrolidone | 29.24 | B |
| Propylene Carbonate | 29.24 | B |
| PD-600 (Surfactant) | 3.51 | B |

Procedure: Phase A was made first by adding a mixture of ethanol and water to Bentone and then stirring for a period of about 10 to 15 minutes.

Phase B was prepared by adding each of the components in any order and then mixing for a period of about 15 minutes in a single spindle mixer at about 800 RPM. Phase B was then added to phase A under shearing force (about 800 to above 1,000 RPM) for 30 minutes or until homogeneous.

Results: Consistency of the product was similar to those of Examples 23 and 24 and to petroleum jelly. Stripping efficiency was acceptable.

EXAMPLE 28

Organoclay Composition # 5

| Component | Weight Percent | Phase |
|---|---|---|
| Bentone EW | 10.31 | A |
| H₂O | 34.35 | A |
| Ethanol (95%) | 10.31 | A |
| Dipentene | 8.94 | B |
| D'limonene | 0.34 | B |
| N-methylpyrrolidone | 15.81 | B |
| Propylene Carbonate | 13.75 | B |
| PD-600 (Surfactant) | 2.75 | B |

| Component | Weight Percent | Phase |
|---|---|---|
| HCFC | 3.44 | B |

Procedure: Phase A was made first by adding a mixture of ethanol and water to Bentone and then stirring for a period of about 10 to 15 minutes. Phase A after mixing was very thick. Amount of Bentone added may necessitate the addition of more ethanol.

Phase B was prepared by adding each of the components in any order and then mixing for a period of about 15 minutes in a single spindle mixer at about 800 RPM. Phase B was then added to phase A under shearing force (about 800 to above 1,000 RPM) for about 1 hour or until homogeneous.

Results: Consistency of the product was very thick, similar to a very thick paste. Stripping efficiency was less than commercially acceptable, but was evident.

EXAMPLE 29

Organoclay Composition #6

| Component | Weight Percent | Phase |
|---|---|---|
| Bentone EW | 3.16 | A |
| H₂O | 21.05 | A |
| Cabosil TM (Amorphous) | 0.52 | A |
| Diatomaceous Earth | 0.52 | A |
| Ethanol (95%) | 10.53 | A |
| Dipentene | 2.11 | B |
| D'limonene | 2.11 | B |
| N-methylpyrrolidone | 26.32 | B |
| Propylene Carbonate | 26.32 | B |
| PD-600 (Surfactant) | 3.16 | B |
| HCFC | 4.24 | B |

Procedure: Phase A was made first by adding a mixture of ethanol and water to Bentone, Cabosil and diatomaceous earth and then stirring (750 RPM magnetic stirrer) for a period of about 10 to 15 minutes. Phase A after mixing was homogeneous.

Phase B was prepared by adding each of the components in any order and then mixing for a period of about 15 minutes in a single spindle mixer at about 800 RPM. Phase B was then added to phase A under shearing force (about 800 to above 1,000 RPM) for about 30 minutes or until homogeneous.

Results: Consistency of the product was excellent, quite gel-like and similar to petroleum jelly. Stripping efficiency was quite adequate.

EXAMPLE 31

Organoclay Composition #7

| Component | Weight Percent | Phase |
|---|---|---|
| Bentone EW | 4.24 | A |
| H₂O | 24.24 | A |
| Dipentene | 2.43 | B |
| D'limonene | 2.43 | B |
| N-methylpyrrolidone | 30.30 | B |
| Propylene Carbonate | 30.30 | B· |
| PD-600 (Surfactant) | 3.64 | B |
| HCFC | 2.43 | B |

Procedure: Phase A was made first by adding water to Bentone, and stirring (750 RPM magnetic stirrer) for a period of about 10 to 15 minutes. Phase A after mixing was homogeneous, but texture was coarse.

Phase B was prepared by adding each of the components in any order and then mixing for a period of about 15 minutes in a single spindle mixer at about 800 RPM. Phase B was then added to phase A under shearing force (about 800 to above 1,000 RPM) for about 30 minutes or until homogeneous.

Results: Consistency of the product was good, thick and somewhat gel-like but less gel-like than compositions containing ethanol. Stripping efficiency was quite adequate.

EXAMPLE 32

Organoclay Composition #8

| Component | Weight Percent | Phase |
|---|---|---|
| Bentone EW | 1.6 | A |
| $H_2O$ | 16.0 | A |
| Ethanol | 8.0 | A |
| Dipentene | 9.6 | B |
| D'limonene | 1.6 | B |
| N-methylpyrrolidone | 32.0 | B |
| Propylene Carbonate | 2.4 | B |
| PD-600 (Surfactant) | 2.4 | B |
| HCFC | 6.4 | B |

Procedure: Phase A was made first by mixing water and ethanol and then adding the resulting mixture to Bentone. The mixture is tirred (750 RPM magnetic stirrer) for a period of about 10 to 15 minutes. Phase A after mixing was homogeneous, quite gel-like.

Phase B was prepared by adding each of the components in any order and then mixing for a period of about 15 minutes in a single spindle mixer at about 800 RPM. Phase B was then added to phase A under shearing force (about 800 to above 1,000 RPM) for about 30 minutes or until homogeneous.

Results: Consistency of the product was good, gel-like, consistency was like petroleum jelly. Stripping efficiency was excellent.

EXAMPLE 33

Organoclay Composition #9

| Component | Weight Percent | Phase |
|---|---|---|
| Bentone EW | 4.0 | A |
| $H_2O$ | 16.0 | A |
| Ethanol | 16.0 | A |
| Dipentene | 1.6 | B |
| D'limonene | 1.6 | B |
| N-methylpyrrolidone | 32.8 | B |
| Propylene Carbonate | 22.4 | B |
| PD-600 (Surfactant) | 2.4 | B |
| HCFC | 3.2 | B |

Procedure: Phase A was made first by mixing water and ethanol and then adding the resulting mixture to Bentone. The mixture is tirred (750 RPM magnetic stirrer) for a period of about 10 to 15 minutes. Phase A after mixing was homogeneous, thick and quite gel-like.

Phase B was prepared by adding each of the components in any order and then mixing for a period of about 15 minutes in a single spindle mixer at about 800 RPM. Phase B was then added to phase A under shearing force (about 800 to above 1,000 RPM) for about 30 minutes or until homogeneous.

Results: Consistency of the product was good, thick, gel-like, consistency was like a thick petroleum jelly. Stripping efficiency was excellent.

EXAMPLE 34

Organoclay Composition #10

| Component | Weight Percent | Phase |
|---|---|---|
| Bentone EW | 1.74 | A |
| $H_2O$ | 8.70 | A |
| Ethanol | 17.39 | A |
| D'limonene | 3.48 | B |
| N-methylpyrrolidone | 34.77 | B |
| Propylene Carbonate | 24.35 | B |
| PD-600 (Surfactant) | 2.61 | B |
| HCFC | 6.96 | B |

Procedure: Phase A was made first by mixing water and ethanol and then adding the resulting mixture to Bentone. The mixture is tirred (750 RPM magnetic stirrer) for a period of about 10 to 15 minutes. Phase A after mixing was homogeneous, somewhat thin and quite gel-like.

Phase B was prepared by adding each of the components in any order and then mixing for a period of about 15 minutes in a single spindle mixer at about 800 RPM. Phase B was then added to phase A under shearing force (about 800 to above 1,000 RPM) for about 30 minutes or until homogeneous.

Results: Consistency of the product was good, gel-like, consistency was like a thin petroleum jelly. Stripping efficiency was excellent.

EXAMPLE 35

Organoclay Composition #11

| Component | Weight Percent | Phase |
|---|---|---|
| Bentone EW | 3.74 | A |
| $H_2O$ | 27.78 | A |
| Ethanol | 6.94 | A |
| D'limonene | 1.39 | B |
| N-methylpyrrolidone | 18.06 | B |
| Propylene Carbonate | 35.42 | B |
| PD-600 (Surfactant) | 6.94 | B |

Procedure: Phase A was made first by mixing water and ethanol and then adding the resulting mixture to Bentone. The mixture is tirred (750 RPM magnetic stirrer) for a period of about 10 to 15 minutes. Phase A after mixing was homogeneous, somewhat thin and quite gel-like.

Phase B was prepared by adding each of the components in any order and then mixing for a period of about 15 minutes in a single spindle mixer at about 800 RPM. Phase B was then added to phase A under shearing force (about 800 to above 1,000 RPM) for about 30 minutes or until homogeneous. After phases A and B were added and mixed until homogeneous, 1 g (about 0.7%) Bentone EW and 2 g (about 1.4%) of Methocell were added to thicken the composition.

Results: Consistency of the product was good, gel-like, after addition of additional thixotropic agent, consistency was like a thick petroleum jelly. Stripping efficiency was adequate, but not as efficient as Examples 33 and 34, perhaps due to the absence of Dipentene and the reduced amount of N-methylpyrrolidone.

EXAMPLE 36

Organoclay Composition #12

| Component | Weight Percent | Phase |
| --- | --- | --- |
| Bentone EW | 6.28 | A |
| $H_2O$ | 41.84 | A |
| Ethanol | 12.56 | A |
| Dipentene | 13.81 | B |
| D'limonene | 2.09 | B |
| N-methylpyrrolidone | 11.30 | B |
| Propylene Carbonate | 8.78 | B |
| PD-600 (Surfactant) | 1.67 | B |
| HCFC | 1.67 | B |

Procedure: Phase A was made first by mixing water and ethanol and then adding the resulting mixture to Bentone. The mixture is tirred (750 RPM magnetic stirrer) for a period of about 10 to 15 minutes. Phase A after mixing was homogeneous, somewhat thin and quite gel-like.

Phase B was prepared by adding each of the components in any order and then mixing for a period of about 15 minutes in a single spindle mixer at about 800 RPM. Phase B was then added to phase A under shearing force (about 800 to above 1,000 RPM) for about 30 minutes or until homogeneous. After phases A and B were added and mixed until homogeneous, 1 g (about 0.7%) Bentone EW and 2 g (about 1.4%) of Methocell were added to thicken the composition.

Results: Consistency of the product was good, gel-like, after addition of additional thixotropic agent, consistency was like a thick petroleum jelly. Stripping efficiency was not commercially acceptable, but was evident.

EXAMPLE 37

Organoclay Composition #13

| Component | Weight Percent | Phase |
| --- | --- | --- |
| Bentone EW | 2.00 | A |
| $H_2O$ | 20.00 | A |
| Ethanol | 10.00 | A |
| Dipentene | 10.00 | B |
| D'limonene | 1.00 | B |
| N-methylpyrrolidone | 22.00 | B |
| Propylene Carbonate | 32.00 | B |
| PD-600 (Surfactant) | 3.00 | B |

Procedure: Phase A was made first by mixing water and ethanol and then adding the resulting mixture to Bentone. The mixture is tirred (750 RPM magnetic stirrer) for a period of about 10 to 15 minutes. Phase A after mixing was homogeneous, somewhat thin and quite gel-like.

Phase B was prepared by adding each of the components in any order and then mixing for a period of about 15 minutes in a single spindle mixer at about 800 RPM. Phase B was then added to phase A under shearing force (about 800 to above 1,000 RPM) for about 30 minutes or until homogeneous. In the case of large batches the amount of mixing under shearing force may exceed one hour or more depending upon the size of the batch.

Results: Consistency of the product was good and gel-like, consistency was like a thick petroleum jelly. Stripping efficiency was excellent. The composition of Example 37 as well as many of the other compositions of the present invention may be used by simply spreading on area to be stripped for a period ranging from as little as 10 to 15 minutes up to periods in excess of 24 hours to strip single or very difficult to strip multiple layers of dissimilar polymeric coatings.

It is to be understood that the examples and embodiments described hereinabove are for the purposes of providing a description of the present invention by way of example and are not to be viewed as limiting the present invention in any way. Various modifications or changes that may be made to that described hereinabove by those of ordinary skill in the art are also contemplated by the present invention and are to be included within the spirit and purview of this application and the following claims.

I claim:

1. A method of making a non caustic coating stripper composition comprising:
   a. mixing about 10% to about 45% by weight of said composition of a polar solvent selected from water, ethanol or a mixture of water and ethanol with about 0.02% to about 8% by weight of a hydrophilic organoclay rheological additive to produce phase A;
   b. mixing about 10% to about 50% by weight of a terpene compound with about 10% to about 69% by weight of a compound selected from the group consisting of pyrrolidones and pyrrolidines to produce phase B; and
   c. adding said phase B and said phase A together and mixing under shear force for a period of at least about 30 minutes to produce said coating stripper composition.

2. The method according to claim 1 wherein said compound (b) is N-methylpyrrolidone.

3. The method according to claim 2 wherein said terpene compound comprises about 10% to about 25% by weight of said composition.

4. The method according to claim 3 wherein said terpene compound is dipentene.

5. The method according to claim 1 wherein said polar solvent comprises about 30% to about 45% by weight of said composition and is a mixture of water and ethanol.

6. The method according to claim 2 wherein said organoclay rheological additive is a hectorite or smectite clay.

7. The method according to claim 6 wherein said organoclay rheological additive is a smectite clay.

8. The method according to claim 1 wherein said phase B further comprises about 5% to about 40% by weight of a high flash point, high $K_B$ solvent selected from the group consisting of ethylene carbonate, propylene carbonate, glycols and glycol ethers.

9. The method according to claim 1 wherein said phase B further comprises about 1% to about 10% by weight of a surfactant.

10. The method according to claim 9 wherein said surfactant is a phosphate ester surfactant.

11. The method according to claim 10 wherein said surfactant is an alkaline stable mixture of mono and di-substituted phosphate esters of decylalcoholethoxylate.

12. The method according to claim 1 wherein said phase B further comprises an odor masking compound.

13. The method according to claim 12 wherein said odor masking compound is d'limonene.

14. The method according to claim 9 wherein said phase B further comprises an HCFC.

15. The method according to claim 1 wherein said terpene is dipentene in an amount ranging from about 10% to about 25% by weight of said composition, said compound (b) is N-Methylpyrrolidone in an amount ranging from about 20% to about 30% by weight of said composition, said organoclay thioxotropic agent is stearalkoniumhectorite in an amount ranging from about 0.02 to about 8% by weight, said polar solvent is a mixture of ethanol and water in an amount ranging from about 30% to about 45% by weight, and said phase B of said composition further comprises propylene carbonate as a high flash point, high $K_B$ solvent in an amount ranging from about 5% to about 40% by weight and a surfactant as an alkaline stable mixture of mono and disubstituted phosphate esters of decylalcoholethoxylate in an amount ranging from about 1% to about 10% by weight.

* * * * *